United States Patent
Ogasawara

(10) Patent No.: US 10,416,967 B2
(45) Date of Patent: Sep. 17, 2019

(54) METHOD OF OPTIMIZING VARGS IN OBJECT-ORIENTED PROGRAMMING LANGUAGES

(71) Applicant: INTERNATIONAL BUSINESS MACHINES CORPORATION, Armonk, NY (US)

(72) Inventor: Takeshi Ogasawara, Tokyo (JP)

(73) Assignee: Internationa Business Machines Corporation, Armonk, NY (US)

( * ) Notice: Subject to any disclaimer, the term of this patent is extended or adjusted under 35 U.S.C. 154(b) by 18 days.

(21) Appl. No.: 15/783,095

(22) Filed: Oct. 13, 2017

(65) Prior Publication Data
US 2019/0114150 A1 Apr. 18, 2019

(51) Int. Cl.
*G06F 8/30* (2018.01)
*G06F 8/41* (2018.01)

(52) U.S. Cl.
CPC ............ *G06F 8/315* (2013.01); *G06F 8/4441* (2013.01)

(58) Field of Classification Search
CPC ..................................... G06F 8/315
USPC ................................ 717/114–167
See application file for complete search history.

(56) References Cited

U.S. PATENT DOCUMENTS

| 5,740,443 A * | 4/1998 | Carini ................ G06F 8/4441 717/133 |
| 6,009,273 A * | 12/1999 | Ayers .................... G06F 8/436 717/143 |
| 7,669,209 B2 * | 2/2010 | Inohara .................. G06F 8/41 719/330 |
| 8,073,979 B2 * | 12/2011 | Kinsey ............... G06F 9/45558 370/254 |
| 8,131,532 B2 * | 3/2012 | Cadambi ............ G06F 11/3608 703/22 |
| 8,612,744 B2 * | 12/2013 | Shieh ................. H04L 63/0218 713/153 |
| 9,235,394 B2 | 1/2016 | Inglis et al. |
| 9,836,288 B2 * | 12/2017 | Stadler ..................... G06F 8/53 |
| 2016/0269421 A1 * | 9/2016 | Hayes ..................... G06F 21/64 |

OTHER PUBLICATIONS

Hawkins, Byron, et al. "Optimizing binary translation of dynamically generated code." Proceedings of the 13th Annual IEEE/ACM International Symposium on Code Generation and Optimization. IEEE Computer Society, 2015.pp. 68-78 (Year: 2015).*

(Continued)

*Primary Examiner* — Satish Rampuria
(74) *Attorney, Agent, or Firm* — Tutunjian & Bitetto, P.C.; Vazken Alexanian

(57) ABSTRACT

A method, an apparatus, and a computer program product for optimizing variable size arguments in a programming language are provided. The method includes finding, in a target program, a call site having a variable-length argument. The method also includes generating a converted code for a callee of the call site, the generating including converting the variable-length argument to a plurality of arguments. The method further includes translating the call site to a call code for calling the converted code with the plurality of arguments instead of the variable-length argument.

20 Claims, 6 Drawing Sheets

(56) References Cited

OTHER PUBLICATIONS

Backes, Michael, et al. "R-droid: Leveraging android app analysis with static slice optimization." Proceedings of the 11th ACM on Asia Conference on Computer and Communications Security. ACM, 2016.pp. 129-140 (Year: 2016).*
Park, J-S., Michael Penner, and Viktor K. Prasanna. "Optimizing graph algorithms for improved cache performance." IEEE Transactions on Parallel and Distributed Systems 15.9 (2004): pp. 769-782. (Year: 2004).*
Lei, Chen. "The study on dynamic population size improvements for classical particle swarm optimization." Proceedings of 2011 International Conference on Computer Science and Network Technology. vol. 1. IEEE, 2011.pp. 430-433 (Year: 2011).*
Xiao, Shucai, et al. "VOCL: An optimized environment for transparent virtualization of graphics processing units." 2012 Innovative Parallel Computing (InPar). IEEE, 2012.pp. 1-12 (Year: 2012).*
Vorontsov, "Java Performance Tuning Guide", http://java-performance.info/java-varargs-performance-issues/, Sep. 14, 2017, pp. 1-5.
Garrett, "Measurement and Application of Dynamic Receiver Class Distributions", Technical Report 94-03-05, May 1994, pp. 1-30.

* cited by examiner

300 ⋮ 310

```
public T1 test0 (int arg, int... args) {
    int length = args.length – 1;
    T1 tmp;
    ...
    for (int i=0; i < length; i++) {
        ...
        tmp = ... args[i];
        ...
    }
    ...
    return tmp;
}
```
*Callee(non-converted)*

⋮

```
public static void main () {
    ...
```
320a

```
    T1 t1 = a.test0 (1, 2, 3, 4);
```
*Call Site 1*

```
    ...
```
320b

```
    T1 t2 = b.test0 (7, 6, 5, 4, 3);
```
*Call Site 2*

```
public T1 test0 (int arg, int... args) {
   ...
}                        Callee(non-converted)
```

410a
```
public T1 test0a (int arg, int arg0, int arg1,
int arg2) {
   int length = 3 – 1;
   T1 tmp;
   ...
   tmp = ... arg0; ... tmp = ... arg1; ... tmp = ... arg2;
   ...
   return tmp;
}                        Callee 1(converted)
```

```
public static void main () {                        420a
   ...
   T1 t1 = a.test0a (1, 2, 3, 4);
                                  Call Site 1
   ...                                              320b
   T1 t2 = b.test0 (7, 6, 5, 4, 3);
                                  Call Site 2
   ....
}
```

```
public T1 test0a (int arg, int arg0, int arg1, int arg2) {
    ...
```
*Callee 1(converted)*

410b

```
public T1 test0b (int arg, int arg0, int arg1, int arg2, int arg3) {
    ...
```
*Callee 2(converted)*

```
public static void main () {
    ...
```
420a

```
    T1 t1 = a.test0a (1, 2, 3, 4);
```
*Call Site 1*

420b

```
    ...
```

```
    T1 t2 = b.test0b (7, 6, 5, 4, 3);
```
*Call Site 2*

METHOD OF OPTIMIZING VARGS IN OBJECT-ORIENTED PROGRAMMING LANGUAGES

BACKGROUND

Technical Field

The present invention relates to optimizing a variable size arguments. More specifically, the present invention relates to optimizing variable size arguments in a programming language by converting the variable size argument to a form that can be more efficiently accessed to increase the performance of executing a program.

Description of the Related Art

Some programming languages, such as Java®, have a capability of using variable-length arguments (varargs or vargs) in a program. Varargs is useful for programmers to improve the simplicity and readability of programs, especially if the number of arguments is not known at the time of writing a method or function using varargs.

Varargs is typically implemented by using an array in the caller side and the callee side. In the caller side, an array is created, arguments listed in varargs are copied to the array, and the array is passed to the callee. In the callee side, each argument of varargs is obtained by accessing each element of the array passed from the caller.

SUMMARY

According to a first aspect of the present invention, a computer-implemented method includes finding, in a target program, a call site having a variable-length argument, generating a converted code for a callee of the call site, the generating including converting the variable-length argument to a plurality of arguments, and translating the call site to a call code for calling the converted code with the plurality of arguments instead of the variable-length argument. The first aspect may also include a computer program product including one or more computer readable storage mediums storing program instructions causing a computer to perform the method, and an apparatus that performs the method.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein:

FIG. 3 shows an example of a target program to be executed, according to an embodiment of the present invention;

FIG. 4 shows an example of a target program including a first converted code for a callee (callee 1) and a translated call site (call site 1) for calling the first converted code for the callee (callee 1), according to an embodiment of the present invention;

FIG. 5 shows an example of a target program including first and second converted codes for a callee (callee 1 and callee 2) and translated first and second call sites (call site 1 and call site 2) for calling the first and second converted codes (callee 1 and callee 2) respectively, according to an embodiment of the present invention.

DETAILED DESCRIPTION

Hereinafter, example embodiments of the present invention will be described. The example embodiments shall not limit the invention according to the claims, and the combinations of the features described in the embodiments are not necessarily essential to the invention.

Figure 1:
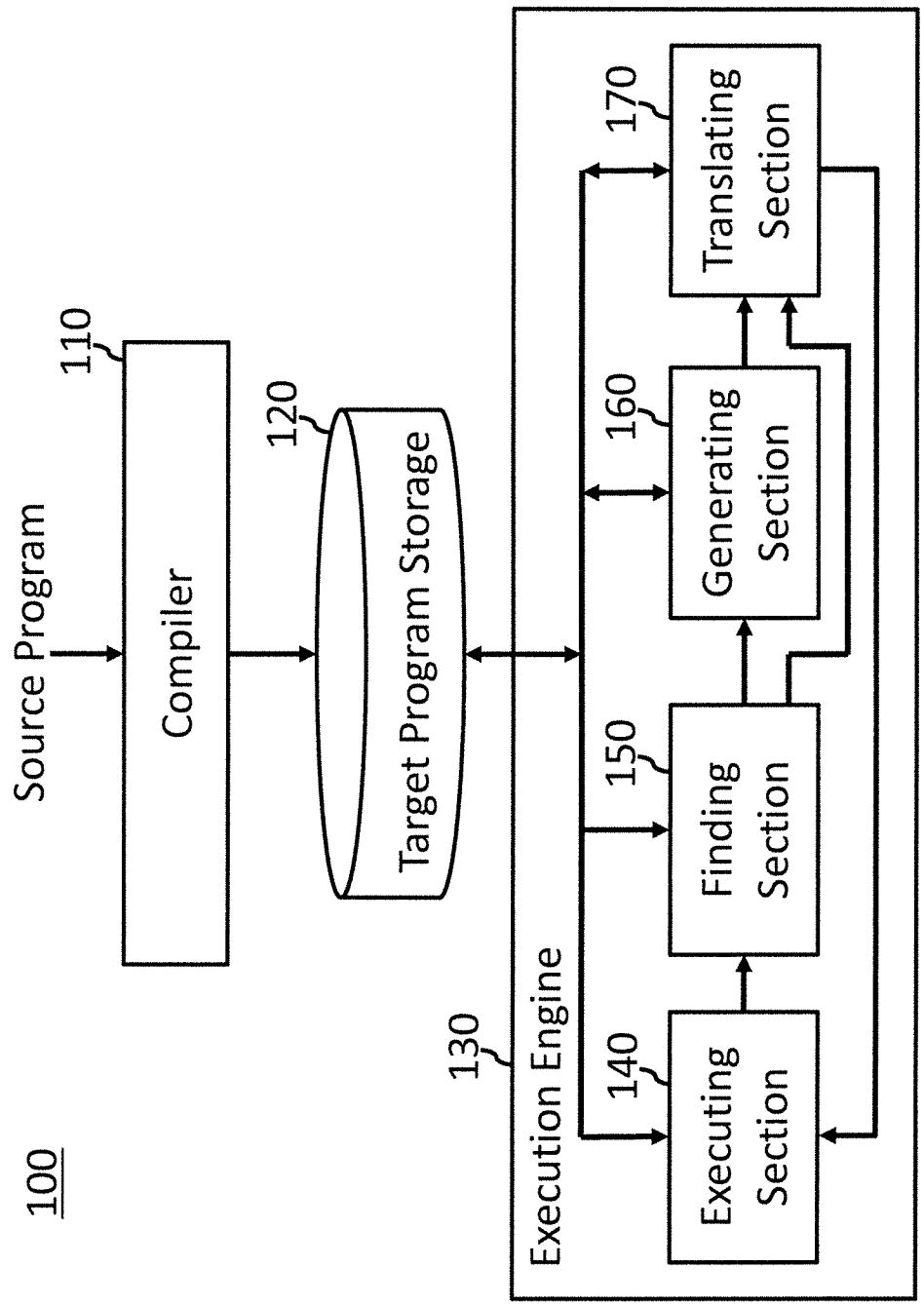
FIG. 1 shows an apparatus for executing a source program, according to an embodiment of the present invention.

FIG. 1 shows an apparatus 100 for executing a source program, according to an embodiment of the present invention. Apparatus 100 may be a personal computer or a client computer such as a desktop computer, a portable computer, a tablet computer, or a smartphone. Apparatus 100 may also be a server computer or a host computer such as a business server, an engineering server, or a mainframe computer. Apparatus 100 may also be a computer system comprising two or more computers.

Apparatus 100 may receive a source program, compile the source program to obtain a target program, and execute the target program. The source program may be written in an object-oriented programming language such as Java, C++, and so on, or any other programming language that allows a programmer to use a variable-length argument. The target program may be a virtual-machine code such as Java Virtual Machine (JVM) code (or Java byte code), an assembly code, a machine language code, or any other intermediate code. In the following explanations, the source program is a Java code and the target program is a JVM code in order to make the embodiments more easily understandable. However, other programming languages may be used.

The source program includes one or more callees such as methods, functions, subroutines, or the like, and each callee may be called from one or more call sites in any other portions of the source program. A callee can have one or more arguments that are used for passing parameter(s), such as values of variables, from a call site to the callee such that the parameter(s) can be accessed in the callee's code.

A callee can have a variable-length argument or variable-size argument (varargs or vargs). For example, describing "int func1(int a, int . . . args)" or "int func1(int a, int[ ] args)" as part of defining "func1" may include defining that the second argument of "func1" is a variable-length argument named "args." The variable-length argument "args" can be an integer array "args[ ]," but the size of the array may not be determined yet or may not be explicitly determined in the definition of "func1."

The length or size of the variable-length argument may be determined in response to encountering a call site that calls the callee having the variable-length argument. For example, if "func1" is called by a call site including a description of "func1(1, 2, 3, 4, 5)," value "1" is assigned to the first argument "a" and the rest of values {2, 3, 4, 5} are assigned to the variable-length argument "args" in a manner such that args[0]=2, args[1]=3, args[2]=4, and args[3]=5. If "func1" is called by another call site including a description of "func1

(7, 6, 5, 4),'' values {6, 5, 4} are assigned to the variable-length argument "args." Therefore, the length or the size of the variable-length argument can be fixed in response to executing the call site, but the length or the size of the variable-length argument may vary between different call sites, or even in the same call site if it passes a different size array as the variable-size argument in different calls.

Although a variable-length argument is useful for programmers, the computational cost for executing a code including variable-length arguments can be higher compared to a code only including normal arguments. Additional costs in the caller side may come from additional computation including allocating and initializing an array data space for the variable-length argument, address range check or index range check for each access to the array, and so on. Additional costs in the callee side may come from additional computation including reading each element from the array including a calculation of the address of indexed element, address range check or index range check for each access to the array, and so on. In some execution environments, it is also required to execute a garbage collection to reclaim unused spaces of arrays allocated to variable-length arguments.

In the following embodiments, apparatus 100 converts a variable-length argument to a plurality of arguments for at least one call from a call site to reduce at least one of the costs for executing a code including variable-length arguments.

Apparatus 100 includes compiler 110, target program storage 120, and execution engine 130. Apparatus 100 may include, as hardware, a processor or programmable circuitry, and one or more computer readable mediums collectively including instructions that, when executed by the processor or the programmable circuitry, cause the processor or the programmable circuitry to perform operations or functions of compiler 110, target program storage 120, and execution engine 130. In other implementations, at least one of compiler 110, target program storage 120, and execution engine 130 may be implemented on a dedicated hardware circuit.

Compiler 110 receives a source program written in a programming language, such as Java as an example. Compiler 110 compiles the source program and outputs a target program, such as a JVM code as an example, to be executed by execution engine 130. Compiler 110 may compile all of the source program before execution engine 130 starts executing the compiled target program. In other implementations, compiler 110 may be a JIT (Just-In-Time) compiler that compiles each portion of the source program. A JIT compiler may compile each portion of the source program just before executing the portion or may compile it on a separate thread without interrupting the target program execution such that the compilation of the source program and the execution of the target program in execution engine 130 can be overlapped or concurrently executed. In addition, a JIT compiler may re-compile each portion of the source program by using profiles about the execution of the target program at runtime.

Target program storage 120 is connected (wirelessly or wired) to compiler 110. Target program storage 120 may be a volatile memory such as DRAM or SRAM, a non-volatile memory such as flash memory, or an external storage device such as a hard disk. Target program storage 120 may receive the target program from compiler 110 and store the target program.

Execution engine 130 is connected to target program storage 120. Execution engine 130 reads the target program from target program storage 120 and executes the target program. Execution engine 130 may be a virtual machine such as a JVM (Java Virtual Machine) that executes the target program written in a virtual machine language such as JVM code. In other implementations, execution engine 130 may be a processor, memory, memory controller and other peripheral circuit that executes the target program written in a machine language including machine instructions for the processor. Execution engine 130 may include executing section 140, finding section 150, generating section 160, and translating section 170.

Executing section 140 executes the target program stored in target program storage 120. Executing section 140 may include a JIT compiler that compiles the target program written in JVM code or intermediate code during execution of the target program. This JIT compiler may compile each portion of the target program just before executing the portion or may compile it on a separate thread without interrupting the target program execution such that the compilation of the target program and the execution of the target program can be overlapped or concurrently executed. In addition, This JIT compiler may re-compile each portion of the target program by using profiles about the execution of the target program at runtime. Alternatively, executing section 140 may be an interpreter that interprets and executes each instruction in the target program sequentially. In implementations in which the target program is written in a machine language, the processor can directly execute the target program.

Finding section 150 finds, in a target program, a call site having a variable-length argument. Finding section 150 may be connected to executing section 140 and may receive a notice that the call site is to be executed. For example, executing section 140 may insert a hook to the call site in the executable of the target program, such that finding section 150 can receive a notice when the call site is going to be executed. Executing section 140 may insert the hook only to the call site that calls a callee having the variable-length argument.

Generating section 160 may be connected to finding section 150 and may receive information of the call site from finding section 150. Generating section 160 generates a converted code for a callee of the call site. In the process of generating the converted code for the callee, generating section 160 converts the variable-length argument to a plurality of arguments. The converted code for the callee is a code that outputs the same result as the original callee's code, but receives the plurality of arguments instead of the variable-length argument of the original callee's code. This may mean that the number of parameters received through the plurality of arguments is limited in the converted code while the original callee's code can theoretically receive any number of parameters through the variable-length argument.

Translating section 170 may be connected to generating section 160, and may receive a notice that the converted code for the callee is generated. Translation section 170 may also be connected to finding section 150, and may receive a notice that the converted code for the callee already exists and thus there is no need for generating section 160 to generate the converted code. Translating section 170 translates the call site to a call code for calling the converted code with the plurality of arguments instead of the variable-length argument. Translating section 170 provides notice to executing section 140 that the call site is translated. Upon receiving this notice, executing section 140 can continue executing the call site so that the translated call site calls the converted code for the callee with the plurality of arguments converted from the variable-length argument.

In some embodiments, the target program may be a source program written in a programming language such as Java, C++, and so on. In this case, execution engine 130 may directly execute the source program as the target program, and compiler 110 can be removed from apparatus 100.

Figure 2:
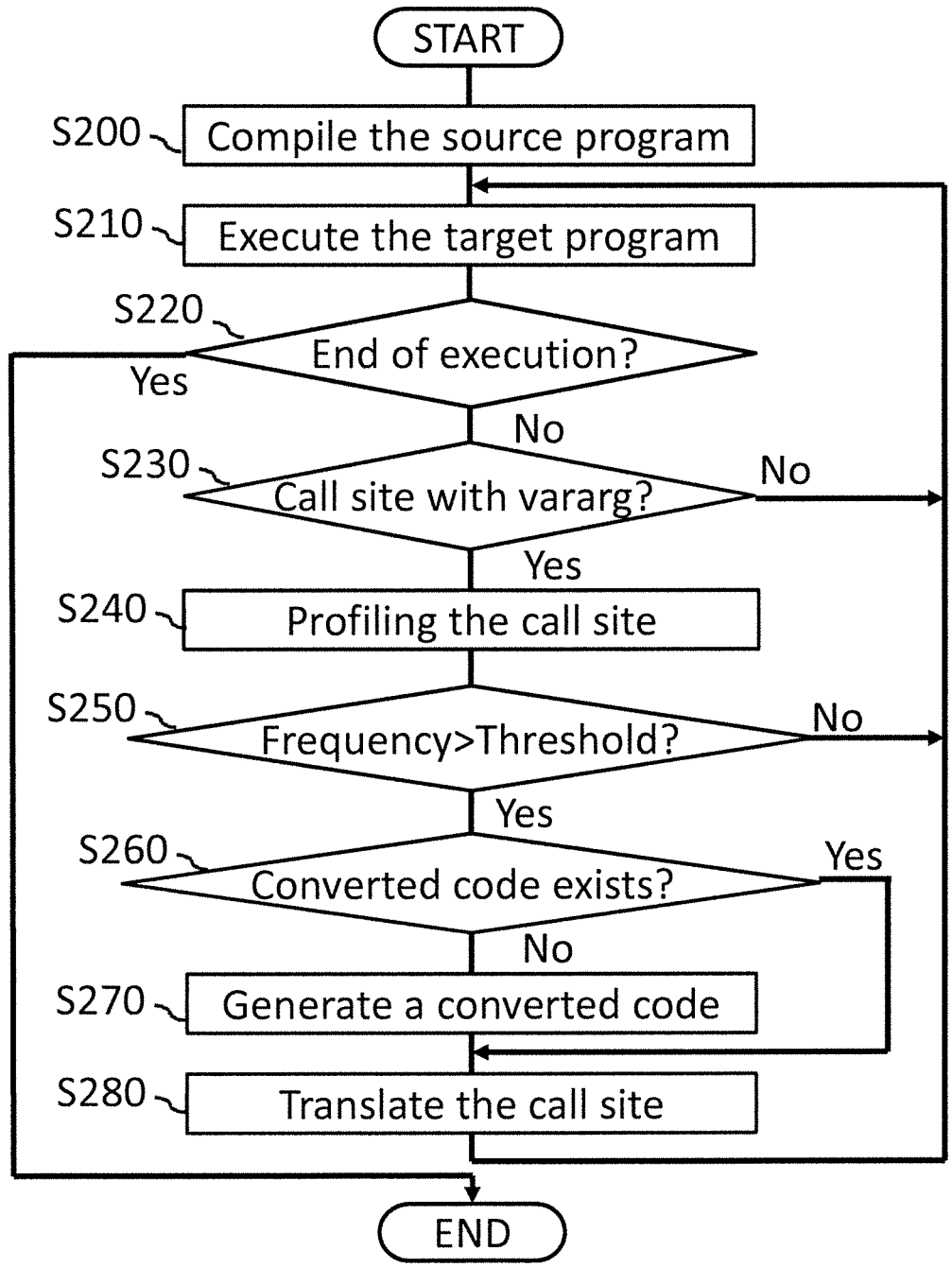
FIG. 2 shows an operational flow for executing a source program, according to an embodiment of the present invention.

FIG. 2 shows an operational flow for executing a source program, according to an embodiment of the present invention. The operations of FIG. 2 can be performed by, for example, apparatus 100 and its components that were explained in reference to FIG. 1. While the operational flow of FIG. 2 will be explained in reference to apparatus 100 and its components, the operational flow can be performed by other apparatus having different components as well.

At S200 (Step 200), compiler 110 receives a source program, and compiles the source program to obtain a target program. Compiler 110 stores the target program in target program storage 120.

At S210, executing section 140 executes the target program stored in target program storage 120. Executing section 140 finishes executing the target program if the execution reaches an end of execution in the target program. Executing section 140 may also interrupt the execution at a call site. In the following explanation, the call site interrupted at S210 is shown as "the current call site." This interrupting point in the target program can be installed in the target program by, for example, inserting a break point or a hook before or in the call site.

At S220, the operational flow is finished if the execution reaches an end of execution (Yes at S220). Otherwise, if the execution is interrupted at a call site, the operational flow proceeds to S230 (No at S220).

At S230 to S250, finding section 150 finds a call site having a variable-length argument to be translated to a call code with a plurality of arguments instead of the variable-length argument. At S230, finding section 150 checks whether the current call site has a variable-length argument. At S240, finding section 150 profiles the current call site by, for example, counting a number of times or frequency of executing the current call site. Finding section 150 may include a table having, for each call site, a value or a counter value storing the number of times the call site was executed, and may increment the value assigned to the current call site interrupted at S210. At S250, finding section 150 checks whether the current call site is executed more frequently than a threshold amount. For example, finding section 150 may check whether the number of the executions of the current call site exceeds a threshold number (e.g. 10 times from starting execution of the target program), or may check whether the frequency of the execution of the current call site exceeds a threshold frequency (e.g. 3 times per second). If the current call site is not executed more frequently than the threshold amount (No at S250), then finding section 150 may transfer the control of the operational flow to executing section 140, and executing section 140 continues executing the target program.

In response to a condition that the current call site is executed more frequently than a threshold amount (Yes at S250), finding section 150 checks, at S260, whether a converted code for the callee of the current call site, which was previously generated during the previous execution of S270 (if any), can be utilized for the current call at the current call site. If there exists a converted code that can be utilized for the current call site (Yes at S260), then finding section 150 skips generating a converted code by skipping S270 and proceeds to S280.

At S270, generating section 160 generates a converted code for a callee of the current call site. At S280, translating section 170 translates the current call site to a call code for calling the converted code with the plurality of arguments instead of the variable-length argument. Translating section 170 proceeds to the operational flow to S210, so that executing section 140 can continue executing the target program from the interruption point.

Various modifications can be applied to the operational flow of FIG. 2. For example, instead of interrupting the execution of the target program at each call site, finding section 150 may scan the target program before executing the call site and insert a break point or a hook before or in the call site having a variable-length argument, such that call sites only having a variable-length argument can be interrupted in S210. In this implementation, S230 can be removed from FIG. 2.

In other implementations, execution engine 130 can be a JIT compiler that compiles each portion or method of the target program on a separate compiler thread from a thread for executing the target program. In this case, execution engine 130 may execute steps for profiling call sites (e.g. S230 to S240) separately from executing steps for converting a variable-length argument to a plurality of arguments (e.g. S250 to S280). The steps for converting a variable-length argument to a plurality of arguments may be executed without interrupting the execution of the target program. When execution section 140 compiles a portion of the target program (e.g. a method of the target program) on a separate compiler thread, execution section 140 may scan the portion of the target program to find call sites with vararg (S230) and insert a hook that profiles each call site with vararg. Then, finding section 150 on another thread can profile each call site with vararg by using the hook during execution of the portion of the target program (S240). Finding section 150 may check the frequency of a profiled call site and trigger compilation of a portion of the target program that includes the call site if the frequency exceeds a threshold (S250). When execution section 140 compiles the portion and in particular the call site on a compiler thread, generating section 160 and translating section 170 may execute S260 to S280 on the compiler thread.

In another example, execution engine 130 can generate a converted code of a callee of the call site without checking the frequency of executing the call site. In this case, S240 and S250 can be removed from FIG. 2.

FIG. 3 shows an example of a target program 300 to be executed, according to an embodiment of the present invention. The target program of this embodiment may be a JVM code. However, to increase the readability of the code in the specification and figures, the code in FIGS. 3 to 5 are described in a programming language of the source program such as Java.

The target program 300 in FIG. 3 is a target program before performing S270 and S280 in FIG. 2 with respect to callee 310 described in FIG. 3. The target program 300 includes callee 310, and call sites 320a and 320b in the "main( )." Callee 310 has an original code compiled from the source program. Callee 310 is a method named "test0," which has two arguments. The first argument "arg" is declared as an integer ("int arg"), and the second argument "args" is declared as a variable-length argument of integer ("int . . . args"). In the method of callee 310, the size (or the number of integer elements) of the variable-length argument "args" is referred by "args.length." In the method of callee 310, the variable-length argument "args" is treated as an array args[ ], and each element of the variable-length argument args is referred as args[index] such as "args[i]" in FIG. 3.

Call site 320a is call site 1 that calls callee 310 with arguments "1," "2," "3," and "4," which will be assigned to the two arguments of "test0." In response to call site 320a is to be executed, each argument of call site 320a is assigned to an argument of the callee in the order listed in the code for the call site and the code for the callee. Therefore, the first argument of "1" is assigned to the first argument "arg" of callee 310. The second, third, and forth arguments "2," "3," and "4" are assigned to the variable-length argument "args," because callee 310 has only one remaining argument "args" and it has a variable-length that can include any number of elements. Therefore, in response to executing call site 320a, the size or number of the variable-length argument becomes three (three integers).

Call site 320b is call site 2 that calls callee 310 with arguments "7," "6," "5," "4," and "3," which will be assigned to the two arguments of "test0." In response to call site 320b is to be executed, each arguments of call site 320b are assigned to each arguments of the callee in the order listed in the code for the call site and the code for the callee. Therefore, the first argument of "7" is assigned to the first argument "arg" of callee 310. The second to fifth arguments "6" to "3" are assigned to the variable-length argument "args." Therefore, in response to executing call site 320b, the size or number of the variable-length argument becomes four (four integers).

FIG. 4 shows an example of a target program 400 including a first converted code 410a for a callee (callee 1) and a translated call site 420a (call site 1) for calling the first converted code 410a for the callee (callee 1), according to an embodiment of the present invention. The target program 400 in FIG. 4 includes callee 310, call site 320b, converted code 410a, and call code 420a. Callee 310 and call site 320b are not changed from FIG. 3.

In response to the interruption at call site 320a in the target program 300 (at S210 in FIG. 2), the first converted code 410a is generated at S270 as the callee 1 of the call site 1 and call site 320a is translated to call code 420a for calling converted code 410a. To generate converted code 410a, generating section 160 may obtain an array size of the variable-length argument that is used in call site 320a. While call site 320a calls "test0" with "1" as "arg" of callee 310 and {2, 3, 4} as the variable-length argument "args" of callee 310, the variable-length argument is recognized as an integer array of size of 3. Generating section 160 may then determine the number of arguments of the plurality of arguments based on the array size. Generating section 160 may determine a number of arguments identical to the array size, or may determine a number of arguments higher than the array size to keep some margin of the number of arguments for other call sites that may be encountered in the future execution.

Generating section 160 generates converted code 410a based on callee 310. For generating converted code 410a, generating section 160 may convert the variable-length argument "args" to a plurality of arguments "arg0," "arg1," and "arg2." In case the variable-length argument is an array of elements, generating section 160 can assign an argument to each array element of the variable-length argument. Each argument of the plurality of arguments may have the same data type (e.g. integer, long, float, double, Boolean, and char, or any other data type including a user defined data type) as the corresponding element of the variable-length argument.

Generating section 160 generates converted code 410a by converting accesses or references to any element of the variable-length argument "args" to accesses or references to the corresponding argument of the plurality of arguments "arg0," "arg1," and "arg2." Generating section 160 may assign a name "test0a" as an example which is different or derived from the name "test0" of the original callee 310 in order to distinguish them in the target program. If the access to an element of the variable-length argument is represented as an array access using a constant index K (0<=K<size N), generating section 160 can assign a (K+1)th argument of the plurality of arguments to this element (e.g. assign 3rd argument "arg2" to "args[2]").

If the access to an element of the variable-length argument is represented as an array access using a variable index, then generating section 160 may try to convert the variable index to a constant index. For example, if the callee has a loop that includes an access to an element of the variable-length argument by using an index that is based on a loop induction variable, then generating section 160 may unroll the loop such that each unrolled access can use a constant index. In FIG. 3, the variable-length argument "args" is accessed by using an index i (i.e. args[i]) in a loop "for (int i=0; i<dept; i++) { . . . }," and "I" is the loop induction variable of this loop. Therefore, generating section 160 can unroll the loop to try to convert accesses to "args[i]" in the loop to accesses "args[0]," "args[1]," and "args[2]" that have constant indices. Then, generating section 160 can convert "args[0]" to "arg0," "args[1]" to "arg1," and "args[2]" to "arg2." In the same manner, generating section 160 can unroll nested loops in response to a condition that the variable-length argument is accessed by using an index or indices that is (are) based on loop induction variable(s). By using this approach, access to elements of the variable-length argument in a callee by using a variable index or indices can be converted to accesses to elements of the variable-length argument by using a constant index or indices in many situations. If the access to an element of the variable-length argument uses a variable index, then generating section 160 may give up generating a converted code because accessing the array with the variable index may be required.

Generating section 160 may also replace or convert a reference to the length of the variable-size argument in the callee to the number of arguments of the variable-size argument in the converted code. For example, the reference to the length of the variable-size argument, such as "args.length," in callee 310 is replaced with "3" in converted code 410a. In other implementations, generating section 160 may assign the length of the variable size argument to the reference. For example, generating section 160 may assign "3" to "args.length" in converted code 410a.

Translating section 170 translates call site 320a to call code 420a for calling converted code 410a (named "test0a") with the plurality of arguments. After this generation and translation, executing section 140 calls converted code 410a from call code 420a and calls callee 310 from call site 320b. In this situation, a converted code such as converted code 410a and a non-converted code, such as callee 310, can coexist in the target program. This coexistence of a converted code and a non-converted code can occur in the following process, as an example, based on the operational flow of FIG. 2.

Finding section 150 finds a first call site 320a for calling callee 310 at S230 to S250, and generating section 160 generates a first converted code 410a for callee 310 having a first number of arguments (e.g. 3), which is based on the array size of the variable-length argument of the first call site 320a at S270. Translating section 170 translates the first call site 320a to a first call code 420a for calling the first converted code 410a with the first number of arguments. In another iteration of the operational flow of FIG. 2, finding section 150 finds a second call site 320*b* for calling callee 310 at S230 to S250. The first call site 320*a* and the second call site 320*b* have the different array sizes of the variable-length argument. However, in certain circumstances (e.g. S250 is not passed), a converted code for callee 310 of the second call site 320*b* is not generated at S270, and thus translating section 170 maintains the second call site 320*b* to call a non-converted code of callee 310 with the variable-length argument.

In this way, an apparatus, such as apparatus 100, can optimize or increase the performance of the call operation of a call site, by generating the converted code for the callee and translating the call site to call the converted code. Apparatus 100 can also selectively use the non-converted code for the callee if a call site that calls the callee has a variable-size argument that does not match the number of arguments of the converted code.

In different situations, the size of the variable-size argument of a call site may not be determined before executing the call site. In these situations, translating section 170 may translate the call site to the call code further for calling a non-converted code with the variable-length argument instead of calling the converted code in response to a runtime condition that the variable-length argument requires an array size that is different from the size of the number of arguments of the plurality of arguments. For example, converted code 410*a* has three arguments assigned to the variable-size argument. translating section 170 can translate a call site to a code sequence that calls the converted code if the call site has exactly three arguments for the variable-length argument but otherwise calls the non-converted code (or other converted code having different numbers of arguments).

If the converted code is correctly operable in response to the smaller number of arguments for the variable-size arguments than the number of arguments that was used to generate the converted code, translating section 170 may translate a call site to the call code further for calling a non-converted code with the variable-length argument instead of calling the converted code in response to a runtime condition that the variable-length argument requires an array size larger than the size of the number of arguments of the plurality of arguments. For example, translating section 170 can translate a call site to a code sequence that calls the converted code if the call site has not more than three arguments for the variable-length argument but otherwise calls the non-converted code (or other converted code having a different number of arguments).

The converted code is correctly operable in response to the smaller number of arguments if, for example, the result or return values of the converted code is not influenced by the surplus arguments that are not substantially used by the call site. For example, if a callee is programmed to calculate the sum of the all elements in the variable-length argument, the surplus arguments from the call site does not influence the sum when the surplus arguments are initialized to zero in the call site. In this manner, translating section 170 can initialize the surplus arguments to values that will not influence the result or return values of the converted code. In other implementations, the generating section 160 may generate the converted code so as to accept the smaller number of arguments for the variable-size argument. For example, the translating section 170 may translate the call site so that the number of valid arguments is passed to the converted code, and the generating section 160 may generate the converted code that checks the number of valid arguments and ignore surplus arguments. In another example, if some values are never used as arguments in the callee, the translating section 170 may translate the call site so that surplus arguments have such unused values, and the generating section 160 may generate the converted code that ignores the surplus arguments by comparing argument values to such unused values. Generating section 160 may also ensure that the converted code causes no additional side effects that could change the program behavior if it receives the surplus arguments. For example, generating section 160 may ensure that the converted code does not change the status of program execution and values of any variables including local and global variables based on the surplus arguments.

In some embodiments, generating section 160 may generate the converted code having a fixed number of arguments, and translating section 170 may translate multiple call sites with variable-length arguments into the calls to the same converted code even if the numbers of arguments for some variable-length arguments are fewer than the fixed number. The fixed number is determined from the maximum array size for the variable-length arguments of two or more call sites for calling the callee if the converted code is correctly operable in response to the smaller number of arguments for the variable-size arguments. In detail, finding section 150 may find a plurality of call sites for calling the callee by, for example, scanning the target program. Generating section 160 may generate the converted code for the callee of the plurality of call sites, which includes converting the variable-length argument to the plurality of argument having a fixed number of arguments, and the fixed number is based on the maximum array size for the variable-length arguments of the plurality of call sites. Translating section 170 may translate each call site of the plurality of call sites to the call code for calling the converted code. In this implementation, finding section 150 may find every call site as the plurality of call sites, or some of the call sites in the target program.

FIG. 5 shows an example of a target program including first and second converted codes for a callee (callee 1 and callee 2) and translated first and second call sites (call site 1 and call site 2) for calling the first and second converted codes (callee 1 and callee 2) respectively, according to an embodiment of the present invention.

Target program 500 may be generated by the following operations. Finding section 150 finds a first call site (e.g. call site 320*a*) for calling the callee (e.g. callee 310) at S230 to S250 in FIG. 2, generating section 160 generates a first converted code (e.g. converted code 410*a*) for the callee having a first number of arguments (e.g. 3) for the variable-size argument partially by determining the first number based on the array size of the variable-length argument of the first call site at S270 in FIG. 2, and translating section 170 translates the first call site to a first call code (e.g. converted code 410*a*) for calling the first converted code with the first number of arguments at S280 in FIG. 2.

Converted code 410*b* and call code 420*b* may be generated such that the first call site (e.g. call site 320*a*) and the second call site (e.g. call site 320*b*) have the different array sizes of the variable-length argument. During the execution of different iterations of the operational flow in FIG. 2, finding section 150 finds a second call site (e.g. call site 320*b*) for calling the callee (e.g. callee 310) at S230 to S250 in FIG. 2, generating section 160 generates a second converted code (e.g. converted code 410*b*) for the callee having a second number of arguments (e.g. 4) for the variable-size argument partially by determining the second number based on the array size of the variable-length argument of the second call site at S270 in FIG. 2, and translating section 170 translates the second call site to a second call code (e.g. call code 420b) for calling the second converted code with the second number of arguments at S280 in FIG. 2. Generating section 160 may optionally delete callee 310 from target program 500 in response to a condition that every call site for calling callee 310 is translated to call one of the converted codes, and thus no call code calls callee 310 in target program 500.

In this way, an apparatus, such as apparatus 100, can optimize or increase the performance of the call operation of two or more call sites having different sizes of the variable-length arguments by generating two or more converted codes for the callee of these call sites, and translating each call site to call the converted code having a corresponding number of arguments assigned to the variable-length argument. Apparatus 100 may also selectively use the non-converted code for the callee if a call site that calls the callee has a variable-size argument that does not match the number of arguments of any converted codes.

Figure 6:
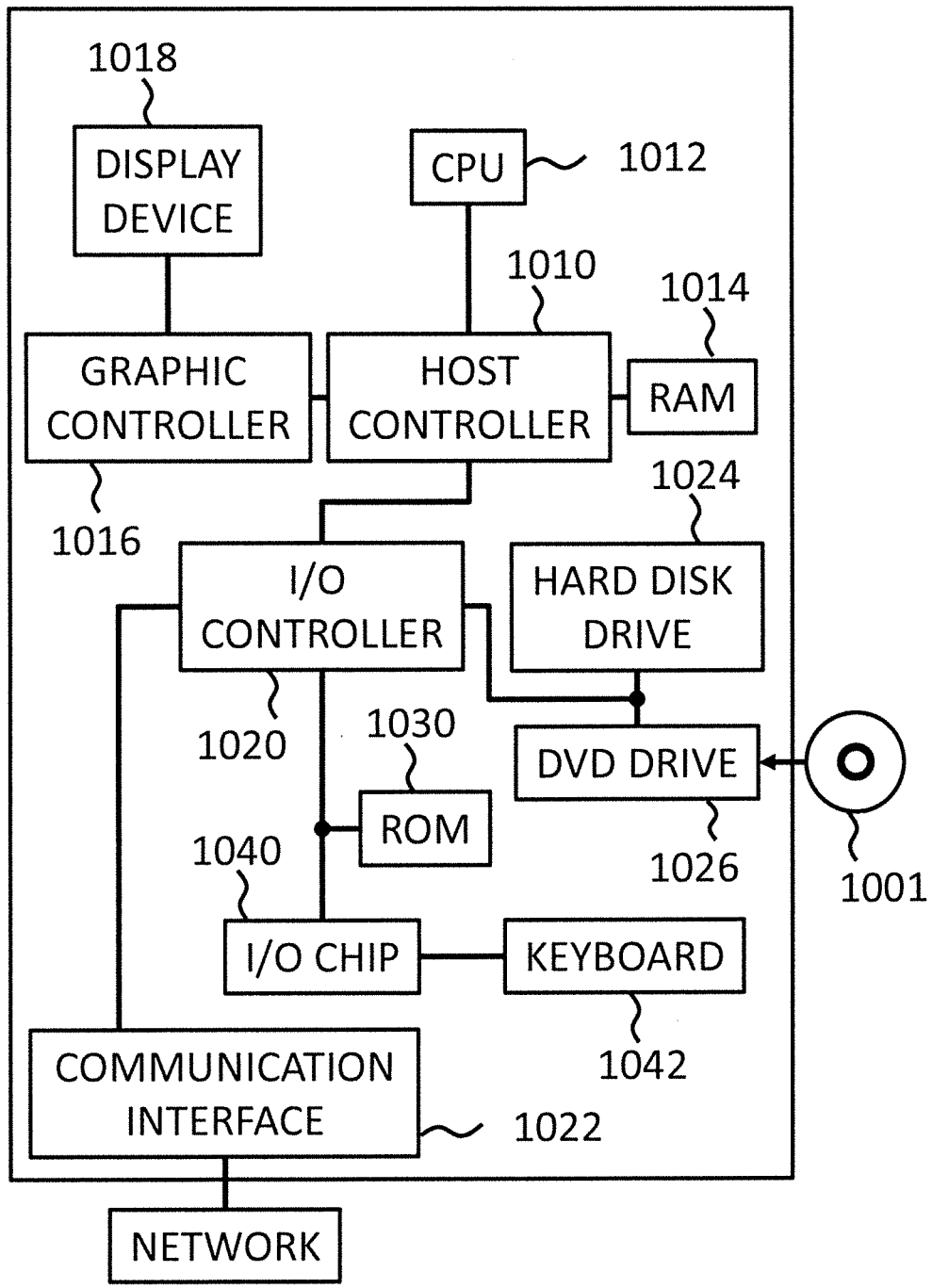
FIG. 6 shows an exemplary hardware configuration of a computer configured for executing a source program, according to an embodiment of the present invention.

FIG. 6 shows an exemplary hardware configuration of a computer configured to perform the foregoing operations, according to an embodiment of the present invention. A program that is installed in the computer 1000 can cause the computer 1000 to function as or perform operations associated with apparatuses of the embodiments of the present invention or one or more sections (including modules, components, elements, etc.) thereof, and/or cause the computer 1000 to perform processes of the embodiments of the present invention or steps thereof. Such a program may be executed by the CPU 1012 to cause the computer 1000 to perform certain operations associated with some or all of the blocks of flowcharts and block diagrams described herein.

The computer 1000 according to the present embodiment includes a CPU 1012, a RAM 1014, a graphics controller 1016, and a display device 1018, which are mutually connected by a host controller 1010. The computer 1000 also includes input/output units such as a communication interface 1022, a hard disk drive 1024, a DVD-ROM drive 1026 and an IC card drive, which are connected to the host controller 1010 via an input/output controller 1020. The computer also includes legacy input/output units such as a ROM 1030 and a keyboard 1042, which are connected to the input/output controller 1020 through an input/output chip 1040.

The CPU 1012 operates according to programs stored in the ROM 1030 and the RAM 1014, thereby controlling each unit. The graphics controller 1016 obtains image data generated by the CPU 1012 on a frame buffer or the like provided in the RAM 1014 or in itself, and causes the image data to be displayed on the display device 1018.

The communication interface 1022 communicates with other electronic devices via a network 1050. The hard disk drive 1024 stores programs and data used by the CPU 1012 within the computer 1000. The DVD-ROM drive 1026 reads the programs or the data from the DVD-ROM 1001, and provides the hard disk drive 1024 with the programs or the data via the RAM 1014. The IC card drive reads programs and data from an IC card, and/or writes programs and data into the IC card.

The ROM 1030 stores therein a boot program or the like executed by the computer 1000 at the time of activation, and/or a program depending on the hardware of the computer 1000. The input/output chip 1040 may also connect various input/output units via a parallel port, a serial port, a keyboard port, a mouse port, and the like to the input/output controller 1020.

A program is provided by computer readable media such as the DVD-ROM 1001 or the IC card. The program is read from the computer readable media, installed into the hard disk drive 1024, RAM 1014, or ROM 1030, which are also examples of computer readable media, and executed by the CPU 1012. The information processing described in these programs is read into the computer 1000, resulting in cooperation between a program and the above-mentioned various types of hardware resources. An apparatus or method may be constituted by realizing the operation or processing of information in accordance with the usage of the computer 1000.

For example, when communication is performed between the computer 1000 and an external device, the CPU 1012 may execute a communication program loaded onto the RAM 1014 to instruct communication processing to the communication interface 1022, based on the processing described in the communication program. The communication interface 1022, under control of the CPU 1012, reads transmission data stored on a transmission buffering region provided in a recording medium such as the RAM 1014, the hard disk drive 1024, the DVD-ROM 1001, or the IC card, and transmits the read transmission data to network 1050 or writes reception data received from network 1050 to a reception buffering region or the like provided on the recording medium.

In addition, the CPU 1012 may cause all or a necessary portion of a file or a database to be read into the RAM 1014, the file or the database having been stored in an external recording medium such as the hard disk drive 1024, the DVD-ROM drive 1026 (DVD-ROM 1001), the IC card, etc., and perform various types of processing on the data on the RAM 1014. The CPU 1012 may then write back the processed data to the external recording medium.

Various types of information, such as various types of programs, data, tables, and databases, may be stored in the recording medium to undergo information processing. The CPU 1012 may perform various types of processing on the data read from the RAM 1014, which includes various types of operations, processing of information, condition judging, conditional branch, unconditional branch, search/replace of information, etc., as described throughout this disclosure and designated by an instruction sequence of programs, and writes the result back to the RAM 1014. In addition, the CPU 1012 may search for information in a file, a database, etc., in the recording medium. For example, when a plurality of entries, each having an attribute value of a first attribute is associated with an attribute value of a second attribute, are stored in the recording medium, the CPU 1012 may search for an entry matching the condition whose attribute value of the first attribute is designated, from among the plurality of entries, and reads the attribute value of the second attribute stored in the entry, thereby obtaining the attribute value of the second attribute associated with the first attribute satisfying the predetermined condition.

The above-explained program or software modules may be stored in the computer readable media on or near the computer 1000. In addition, a recording medium such as a hard disk or a RAM provided in a server system connected to a dedicated communication network or the Internet can be used as the computer readable media, thereby providing the program to the computer 1000 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a flexible disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It will be apparent to persons skilled in the art that various alterations and improvements can be added to the above-described embodiments. It should also apparent from the scope of the claims that the embodiments added with such alterations or improvements are within the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A computer-implemented method comprising:
   finding, in a target program during execution, a call site having a variable-length argument,
   generating, by a processor, a converted code for a callee of the call site, the generating including converting the variable-length argument to a plurality of arguments and unrolling a loop that includes an access to an element of the variable-length argument by using an index that is based on a loop induction variable, and
   translating, by the processor, the call site to a call code for calling the converted code with the plurality of arguments instead of the variable-length argument.

2. The computer-implemented method of claim 1, wherein the finding the call site finds the call site that is executed more frequently than a threshold amount.

3. The computer-implemented method of claim 1, wherein the generating the converted code includes:
   obtaining an array size of the variable-length argument, and
   determining the number of arguments of the plurality of arguments based on the array size.

4. The computer-implemented method of claim 3, wherein
   the finding the call site finds a first call site for calling the callee and a second call site for calling the callee, the first call site and the second call site having the different array sizes of the variable-length argument,
   the generating the converted code generates a first converted code for the callee having a first number of arguments and a second converted code for the callee having a second number of arguments, the first number of arguments is based on the array size of the variable-length argument of the first call site, the second number of arguments is based on the array size of the variable-length argument of the second call site, and
   the translating the call site translates the first call site to a first call code for calling the first converted code with the first number of arguments and translates the second call site to a second call code for calling the second converted code with the second number of arguments.

5. The computer-implemented method of claim 3, wherein
   the finding the call site finds a first call site for calling the callee and a third call site for calling the callee, the first call site and the third call site having the different array sizes of the variable-length argument,
   the generating the converted code generates a first converted code for the callee having a first number of arguments, the first number of arguments is based on the array size of the variable-length argument of the first call site, and
   the translating the call site translates the first call site to a first call code for calling the first converted code with the first number of arguments, and maintains the third call site to call a non-converted code with the variable-length argument.

6. The computer-implemented method of claim 3, wherein
   the translating the call site translates the call site to the call code further for calling a non-converted code with the variable-length argument instead of calling the converted code in response to a runtime condition that the variable-length argument requires an array size larger than the size of the number of arguments of the plurality of arguments.

7. The computer-implemented method of claim 3, wherein
   the finding the call site finds a plurality of call sites for calling the callee,
   the generating the converted code generates the converted code for the callee of the plurality of call sites, the generating including converting the variable-length argument to the plurality of argument having a fixed number of arguments, the fixed number is based on the maximum array size for the variable-length arguments of the plurality of call sites, and
   the translating the call site translates each call sites of the plurality of call sites to the call code for calling the converted code.

8. The computer-implemented method of claim 1, wherein each of the unrolled access utilize a constant index.

9. A computer program product including one or more computer readable storage mediums correctively storing program instructions that are executable by a processor or programmable circuitry to cause the processor or programmable circuitry to perform operations comprising:
   finding, in a target program during execution, a call site having a variable-length argument,
   generating, by a processor, a converted code for a callee of the call site, the generating including converting the variable-length argument to a plurality of arguments and unrolling a loop that includes an access to an element of the variable-length argument by using an index that is based on a loop induction variable, and
   translating, by the processor, the call site to a call code for calling the converted code with the plurality of arguments instead of the variable-length argument.

10. The computer program product of claim 9, wherein the finding the call site finds the call site that is executed more frequently than a threshold amount.

11. The computer program product of claim 9, wherein the generating the converted code includes:
   obtaining an array size of the variable-length argument, and
   determining the number of arguments of the plurality of arguments based on the array size.

12. The computer program product of claim 11, wherein
   the finding the call site finds a first call site for calling the callee and a second call site for calling the callee, the first call site and the second call site having the different array sizes of the variable-length argument,
   the generating the converted code generates a first converted code for the callee having a first number of arguments and a second converted code for the callee having a second number of arguments, the first number of arguments is based on the array size of the variable-length argument of the first call site, the second number of arguments is based on the array size of the variable-length argument of the second call site, and
   the translating the call site translates the first call site to a first call code for calling the first converted code with the first number of arguments and translates the second call site to a second call code for calling the second converted code with the second number of arguments.

13. The computer program product of claim 11, wherein
the finding the call site finds a first call site for calling the callee and a third call site for calling the callee, the first call site and the third call site having the different array sizes of the variable-length argument,
the generating the converted code generates a first converted code for the callee having a first number of arguments, the first number of arguments is based on the array size of the variable-length argument of the first call site, and
the translating the call site translates the first call site to a first call code for calling the first converted code with the first number of arguments, and maintains the third call site to call a non-converted code with the variable-length argument.

14. The computer program product of claim 9, wherein each of the unrolled access utilize a constant index.

15. An apparatus comprising:
a processor or programmable circuitry, and
one or more computer readable mediums collectively including instructions that, when executed by the processor or the programmable circuitry, cause the processor or the programmable circuitry to:
find, in a target program during execution, a call site having a variable-length argument,
generate, by the processor, a converted code for a callee of the call site, the generating including converting the variable-length argument to a plurality of arguments and unrolling a loop that includes an access to an element of the variable-length argument by using an index that is based on a loop induction variable, and
translate, by the processor, the call site to a call code for calling the converted code with the plurality of arguments instead of the variable-length argument.

16. The apparatus of claim 15, wherein the finding the call site finds the call site that is executed more frequently than a threshold amount.

17. The apparatus of claim 15, wherein the generating the converted code includes:
obtaining an array size of the variable-length argument, and
determining the number of arguments of the plurality of arguments based on the array size.

18. The apparatus of claim 17, wherein
the finding the call site finds a first call site for calling the callee and a second call site for calling the callee, the first call site and the second call site having the different array sizes of the variable-length argument,
the generating the converted code generates a first converted code for the callee having a first number of arguments and a second converted code for the callee having a second number of arguments, the first number of arguments is based on the array size of the variable-length argument of the first call site, the second number of arguments is based on the array size of the variable-length argument of the second call site, and
the translating the call site translates the first call site to a first call code for calling the first converted code with the first number of arguments and translates the second call site to a second call code for calling the second converted code with the second number of arguments.

19. The apparatus of claim 17, wherein
the finding the call site finds a first call site for calling the callee and a third call site for calling the callee, the first call site and the third call site having the different array sizes of the variable-length argument,
the generating the converted code generates a first converted code for the callee having a first number of arguments, the first number of arguments is based on the array size of the variable-length argument of the first call site, and
the translating the call site translates the first call site to a first call code for calling the first converted code with the first number of arguments, and maintains the third call site to call a non-converted code with the variable-length argument.

20. The apparatus of claim 15, wherein each of the unrolled access utilize a constant index.

* * * * *